United States Patent
Sakurazawa

(10) Patent No.: US 6,655,263 B2
(45) Date of Patent: Dec. 2, 2003

(54) NOODLE GELATING DEVICE

(75) Inventor: Hatsuo Sakurazawa, Takasaki (JP)

(73) Assignee: Fuji Manufacturing Corporation Ltd. (JP)

( * ) Notice: Subject to any disclaimer, the term of this patent is extended or adjusted under 35 U.S.C. 154(b) by 0 days.

(21) Appl. No.: 10/312,898

(22) PCT Filed: Jun. 19, 2001

(86) PCT No.: PCT/JP01/05227
§ 371 (c)(1),
(2), (4) Date: Dec. 30, 2002

(87) PCT Pub. No.: WO02/09536
PCT Pub. Date: Feb. 7, 2002

(65) Prior Publication Data
US 2003/0101874 A1 Jun. 5, 2003

(30) Foreign Application Priority Data
Jul. 28, 2000 (JP) .......................... 2000-228422

(51) Int. Cl.[7] .......................... A23L 1/00; A47J 27/00; A47J 27/16; A47J 37/00
(52) U.S. Cl. .......................... 99/330; 99/352; 99/386; 99/404; 99/443 C; 99/483; 99/516
(58) Field of Search .......................... 99/330, 331, 337, 99/338, 386, 352–355, 403–410, 443 R, 443 C, 444–450, 483, 516, 534, 536; 426/509, 510, 523, 231–233

(56) References Cited

U.S. PATENT DOCUMENTS

| | | | | |
|---|---|---|---|---|
| 1,926,313 A | * | 9/1933 | Smith | 426/39 |
| 2,112,309 A | * | 3/1938 | Santillan | 99/353 |
| 2,512,591 A | * | 6/1950 | Alexander | 99/353 X |
| 2,855,308 A | * | 10/1958 | Buechele et al. | 426/438 |
| 3,440,953 A | * | 4/1969 | Groffon | 99/404 X |
| 3,626,466 A | * | 12/1971 | Liepa | 99/353 |
| 4,561,347 A | * | 12/1985 | Zaitu | 99/352 |
| 4,697,507 A | * | 10/1987 | Nagasaki | 99/483 |
| 6,528,103 B2 | * | 3/2003 | Pegoraro et al. | 426/523 X |

FOREIGN PATENT DOCUMENTS

| | | |
|---|---|---|
| JP | 52-156971 | 12/1977 |
| JP | 7-99909 A | 4/1995 |
| JP | 10-108638 A | 4/1998 |

OTHER PUBLICATIONS

Copy of International Search Report dated Jul. 24, 2001.

* cited by examiner

Primary Examiner—Timothy F. Simone
(74) Attorney, Agent, or Firm—Young & Basile, P.C.

(57) ABSTRACT

To reduce running costs and equipment costs by bringing entire surfaces of noodle strings carried on a conveyor into contact with steam. High-temperature steam is upwardly supplied from a steam pipes (30) installed on a lower cover (24), by running a delivery belt lane (36a) of a belt conveyor (28)through a steam chamber (26). The belt conveyor (28) is equipped with an endless belt (36), whose delivery lane (36a) passes through the steam chamber (26). The belt (36) is a thin, mesh belt positioned so as to partition the steam chamber (26) into an upper steam chamber (26a) and a lower steam chamber (26b).

2 Claims, 2 Drawing Sheets

NOODLE GELATING DEVICE

TECHNICAL FIELD

The present invention relates to a noodle gelatinization apparatus.

BACKGROUND ART

A common manufacturing method of instant noodles involves putting wheat flour, buckwheat flour, starch, and other raw materials into a kneading machine such as a mixer, adding mixing water prepared in advance, and kneading the mixture for a designated time. Then, a dough taken out of the kneading machine is rolled into a designated thickness by a rolling mill and cut into noodle strings of a designated length by a noodle cutter. The noodle strings are sent on a conveyor to a gelatinization apparatus, steamed in a steam atmosphere of the gelatinization apparatus for a designated time, and conveyed to a frying apparatus and a hot air apparatus for a drying process. The steaming process on the above described gelatinization apparatus is performed to convert starch in the noodle strings into a digestible form, i.e., to convert it into a-starch, by heating it in the presence of water.

FIG. 3 is a sectional view showing an internal structure of a conventional gelatinization apparatus. In this apparatus, a delivery lane of a net conveyor 9 runs in an inner space 6 formed by an upper cover 2 and a lower cover 4 and horizontally extending and steam is supplied upward from the steam pipes 8 installed on the lower cover 4 to use the inner space 6 as a steam chamber 6.

The above described net conveyor 9 comprises two endless roller chains 10 and 12 placed in parallel with each other, a net 14 stretched between the roller chains 10 and 12, rails 16 which are placed at the lateral ends of the upper cover 2a and lower cover 2b and which turn the rollers of the roller chains 10 and 12, and drive sprockets (not shown) for driving the roller chains 10 and 12.

The net 14 on the delivery lane passes through the steam chamber 6 at a designated conveying speed to allow the noodle strings N placed on the net 14 to be steamed in a steaming process.

The net 14 of the net conveyor 9 is a thick net made of corrosion-proof metal wires, such as stainless steel wires, knitted finely, making it difficult for the steam supplied upward from the steam pipes 8 to pass through the net 14. Therefore, the steam flows to the upper part of the steam chamber detouring through the roller chains 10 and 12 on the lateral sides of the net 14.

Like this, for the conventional noodle gelatinization apparatus equipped with a net 14 that does not permit smooth passage of air, measures are taken to eliminate incomplete steaming of the lower part (the part in contact with the net 14) of noodle strings N on the net 14, including measures to increase the density of the mist in the steam chamber 6 by increasing the amount of steam supplied from the steam pipes 8 so that steam will spread all over the lower part of noodle strings N, measures to slow the conveying speed of the net 14, and measures to increase the length of the steaming process line.

However, a large steaming process time or requirement for a great amount of steam will pose a problem in terms of running costs.

Besides, the use of a net conveyor 9 equipped with a thick net 14 involves upsizing of the gelatinization apparatus and the extension of the steaming process line involves extension of the noodle production line, posing a problem in terms of equipment costs.

The present invention has been achieved in view of the above problems. Its object is to provide a noodle gelatinization apparatus that brings the entire surfaces of the noodle strings carried on a conveyor into contact with steam, reducing running costs and equipment costs.

DISCLOSURE OF THE INVENTION

The noodle gelatinization apparatus according to the present invention runs a steaming process of noodle strings by passing the above described noodle strings on a conveyor through a steam chamber, in which the above described conveyor is a belt conveyor which comprises a mesh, endless belt looped over belt pulleys placed outside the above described steam chamber; the delivery belt lane of the above described belt conveyor runs in the above described steam chamber so that the above described steam chamber will be partitioned into an upper steam chamber and lower steam chamber; and steam is supplied upward from the steam pipes installed in the above described lower steam chamber so that the above described steam will flow upward through the meshes in the above described delivery belt lane.

Also, the lateral ends of the above described belt come into contact with the above described steam chamber and partition the above described upper steam chamber and the above described lower steam chamber so that the above described delivery belt lane runs through the above described steam chamber while the above described belt slides with the above described steam chamber.

BEST MODE FOR PRACTICING THE INVENTION

One embodiment of the noodle gelatinization apparatus according to the present invention will be described below with reference to drawings.

Figure 1:
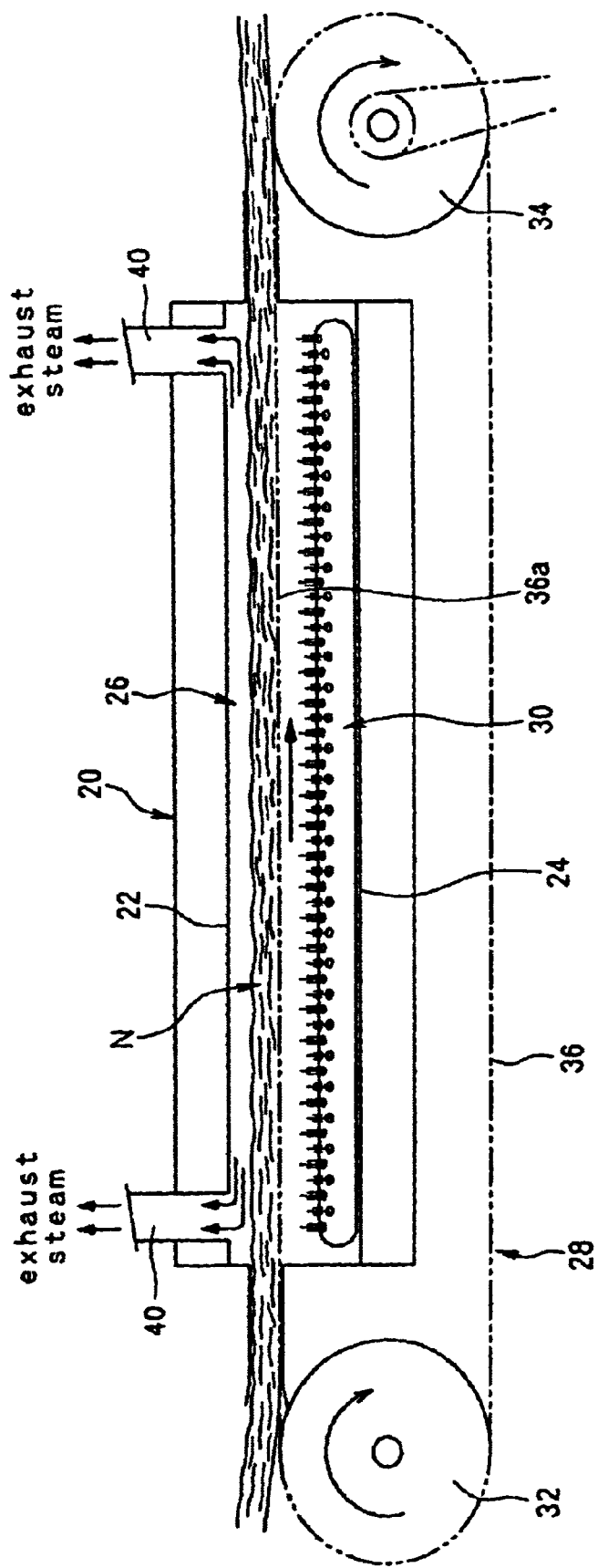
FIG. 1 is a general view of a noodle gelatinization apparatus according to the present invention.
Figure 2:
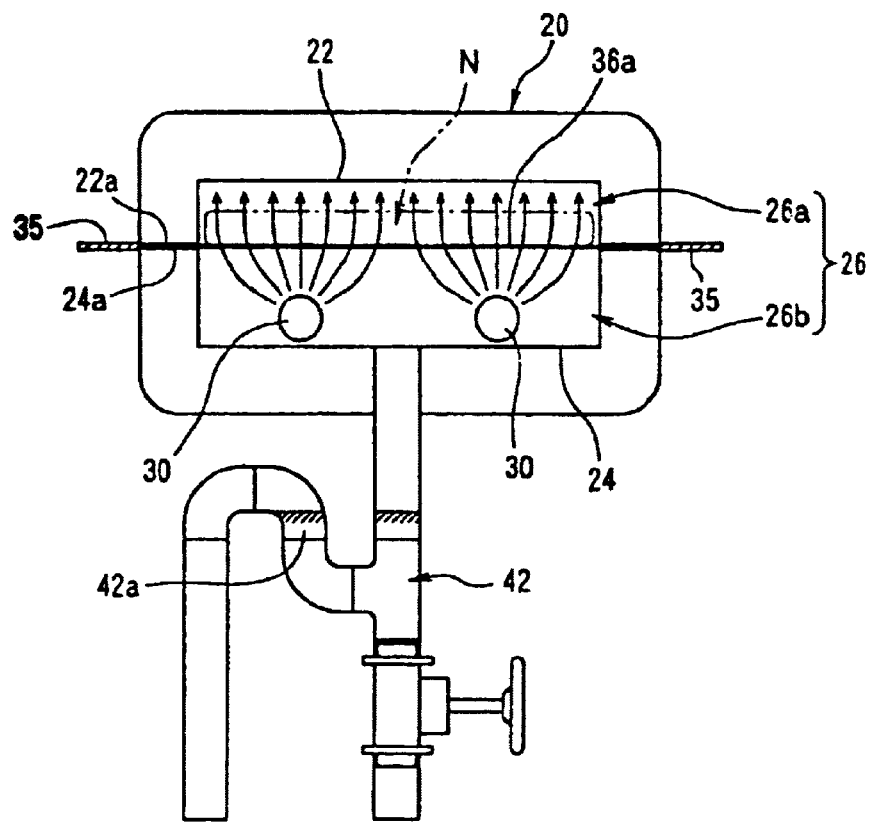
FIG. 2 is a sectional view of the noodle gelatinization apparatus.
Figure 3:
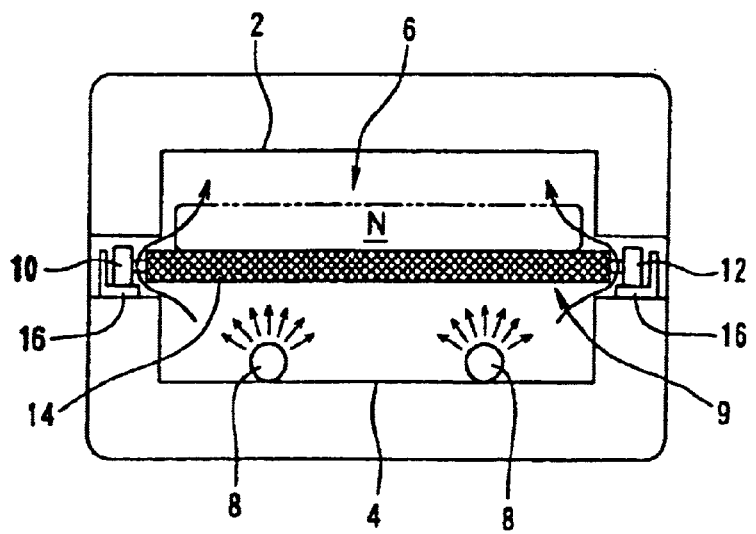
FIG. 3 is a sectional view of a conventional noodle gelatinization apparatus.

FIG. 1 is a general view of the noodle gelatinization apparatus according to one embodiment while FIG. 2 is a sectional view of the apparatus.

In an apparatus 20 according to this embodiment, a delivery belt lane 36a of a belt conveyor 28 runs in a steam chamber 26 formed by an upper cover 22 and a lower cover 24 and extending horizontally and high-temperature steam is supplied upward from steam pipes 30 installed on a lower cover 24.

The belt conveyor 28 comprises a pair of drive pulleys 32 and 34 placed outside the steam chamber 26 and an endless belt 36 looped over drive pulleys 32 and 34, wherein the delivery belt lane 36a runs through the steam chamber 26 in the direction of an arrow.

The belt 36 used here is a thin, mesh belt made of Teflon which is resistant to heat and corrosion.

The delivery belt lane 36a in the steam chamber 26 is laid in such a way as to partition the steam chamber 26 into an upper steam chamber 26a and a lower steam chamber 26b, as shown in FIG. 2.

Specifically, at the lateral ends of the upper cover 22 and the lower cover 24, flanges 22a and 24a face each other with a small gap between them. The delivery belt lane 36a is laid between the flanges 22a and 24a such that the lateral ends will slide. Incidentally, reference numeral 35 in FIG. 1 denotes packing which plugs gaps between the flanges 22a and 24a placed outside lateral ends of the delivery belt lane 36a.

The portions 40 projecting upward from the entrance side and exit side of the steam chamber 26 are exhaust steam ports.

The piping connected to the lower cover 24 in FIG. 2 is a drainage line 42 for draining any water that will gather in the lower cover 24. A trap 42a with water enclosed in it is provided in the drainage line 42 to prevent the steam in the steam chamber 26 from escaping outside through the drainage line 42.

The noodle strings N advance in the direction of an arrow on the delivery belt lane 36a in the steam chamber 26. They have a long linear form as noodle strips rolled into a designated thickness on a rolling mill are cut by a cutter.

When the noodle strings N are conveyed on the delivery belt lane 36a into the steam chamber 26, since the steam chamber 26 has been partitioned into the upper steam chamber 26a and the lower steam chamber 26b by the delivery belt lane 36a, the high-temperature steam delivered from the steam pipes 30 goes up into the upper steam chamber 26a through the meshes in the delivery belt lane 36a, coming into direct contact with the lower part (the part in contact with the delivery belt lane 36a) of the noodle strings N. The upper part of the noodle strings also come into contact with the steam in the upper steam chamber 26a.

The apparatus according to this embodiment, which has been designed such that the steam passing through the meshes of the delivery belt lane 36a comes into direct contact with the lower part of the noodle strings N as described above, can steam the noodle strings N perfectly without increasing any amount of steam supplied from the steam pipes 30, slowing the conveying speed of the delivery belt lane 36a, or increasing the length of the steaming process line. This reduces the steaming process time and suppresses steam consumption, resulting in low running costs.

Also, the use of the belt conveyor 28 with the thin belt 36 as conveyance means reduces the size of the gelatinization apparatus and shortens the length of the steaming process line, resulting in low equipment costs.

Although this embodiment employs the Teflon belt 36 for the conveyor 28, this does not limit the scope of the present invention, similar effect can be achieved by a belt made of another resin or thin belt made of metal wires knitted into meshes for steam to pass readily.

INDUSTRIAL APPLICABILITY

The noodle gelatinization apparatus according to the present invention brings the lower part of noodle strings into direct contact with steam by passing the noodle strings on a conveyor through a steam chamber, in which the conveyor is a belt conveyor which comprises a mesh, endless belt looped over belt pulleys placed outside the steam chamber; the delivery belt lane of the belt conveyor runs in the steam chamber so that the steam chamber will be partitioned into an upper steam chamber and lower steam chamber; and steam is supplied upward from the steam pipes installed in the lower steam chamber so that the steam will flow upward through the meshes in the delivery belt lane. This reduces the steaming process time and suppresses steam consumption, resulting in low running costs. Also, the use of the belt conveyor with the thin belt reduces the size of the gelatinization apparatus and shortens the length of the steaming process line, resulting in low equipment costs.

What is claimed is:

1. A noodle gelatinization apparatus which runs a steaming process of noodle strings by passing said noodle strings on a conveyor through a steam chamber, wherein said conveyor is a belt conveyor which comprises a mesh, endless belt looped over belt pulleys placed outside said steam chamber; a delivery belt lane of said belt conveyor runs in said steam chamber so that said steam chamber is partitioned into an upper steam chamber and a lower steam chamber; and steam is supplied upward from steam pipes installed in said lower steam chamber so that said steam will flow upward through meshes in said delivery belt lane.

2. The noodle gelatinization apparatus according to claim 1, wherein the lateral ends of said belt come into contact with said steam chamber and partition said upper steam chamber and said lower steam chamber, and said delivery belt lane runs through said steam chamber while said belt slides with said steam chamber.

* * * * *